United States Patent
Lucas

(10) Patent No.: US 8,805,810 B2
(45) Date of Patent: Aug. 12, 2014

(54) GENERALIZED RECONCILIATION IN A DISTRIBUTED DATABASE

(75) Inventor: Jason Lucas, Burlingame, CA (US)

(73) Assignee: Tagged, Inc., San Francisco, CA (US)

( * ) Notice: Subject to any disclaimer, the term of this patent is extended or adjusted under 35 U.S.C. 154(b) by 24 days.

(21) Appl. No.: 13/564,187

(22) Filed: Aug. 1, 2012

(65) Prior Publication Data

US 2013/0036106 A1 Feb. 7, 2013

Related U.S. Application Data

(60) Provisional application No. 61/513,932, filed on Aug. 1, 2011.

(51) Int. Cl.
*G06F 7/00* (2006.01)
*G06F 17/30* (2006.01)

(52) U.S. Cl.
USPC .......................................................... 707/703

(58) Field of Classification Search
None
See application file for complete search history.

(56) References Cited

U.S. PATENT DOCUMENTS

| | | | |
|---|---|---|---|
| 5,781,912 A | 7/1998 | Demers et al. | |
| 5,806,074 A | 9/1998 | Souder et al. | |
| 5,864,851 A | 1/1999 | Breitbart et al. | |
| 5,960,194 A | 9/1999 | Choy et al. | |
| 5,978,577 A | 11/1999 | Rierden et al. | |
| 5,999,931 A | 12/1999 | Breitbart et al. | |
| 6,203,011 B1 | 3/2001 | Nulph | |
| 6,377,959 B1 | 4/2002 | Carlson | |
| 6,640,244 B1 | 10/2003 | Bowman-Amuah | |
| 6,772,152 B2 | 8/2004 | Wang et al. | |
| 6,949,022 B1 | 9/2005 | Showers et al. | |
| 7,016,921 B1 | 3/2006 | Berger | |
| 7,089,253 B2 | 8/2006 | Hinshaw et al. | |
| 7,149,737 B1 | 12/2006 | Luo et al. | |
| 7,810,056 B1 * | 10/2010 | Garg et al. | 716/104 |
| 7,895,172 B2 | 2/2011 | Cooper et al. | |
| 2002/0115489 A1 | 8/2002 | Jordan et al. | |
| 2003/0074321 A1 | 4/2003 | Peled | |
| 2004/0030703 A1 | 2/2004 | Bourbonnais et al. | |
| 2004/0167927 A1 | 8/2004 | Ronstrom | |
| 2005/0055384 A1 | 3/2005 | Ganesh et al. | |
| 2006/0149786 A1 | 7/2006 | Nishiyama | |
| 2007/0027896 A1 | 2/2007 | Newport et al. | |
| 2008/0109494 A1 | 5/2008 | Chitre et al. | |

(Continued)

FOREIGN PATENT DOCUMENTS

| | | |
|---|---|---|
| EP | 0567999 A2 | 11/1993 |
| EP | 1788496 A2 | 5/2007 |

OTHER PUBLICATIONS

Hoffer et al., http://wps.prenhall.com/wps/media/objects/3310/3390076/hoffer_ch13.pdf, accessed Aug. 1, 2012, 30 pages.

(Continued)

*Primary Examiner* — Uyen Le
(74) *Attorney, Agent, or Firm* — Perkins Coie LLP

(57) ABSTRACT

Embodiments of the present disclosure include systems and methods for generalized consistency control of database transactions in a distributed database. In distributed database systems a specific reconciliation procedure is typically needed and coded for each possible irresolvable event. The systems and methods described herein enable a general characterization of multiple types of irresolvable events and thus eliminate and/or reduce the need to write individual code for every specific event.

28 Claims, 7 Drawing Sheets

(56) References Cited

U.S. PATENT DOCUMENTS

| | | | |
|---|---|---|---|
| 2009/0106323 | A1 | 4/2009 | Wong et al. |
| 2009/0119346 | A1 | 5/2009 | Lu et al. |
| 2011/0231447 | A1 | 9/2011 | Starkey |
| 2012/0166407 | A1 | 6/2012 | Lee et al. |
| 2012/0233139 | A1 | 9/2012 | Larson et al. |
| 2013/0124467 | A1 | 5/2013 | Naidu et al. |

OTHER PUBLICATIONS

International Search Report mailed Jan. 7, 2013 of PCT Application No. PCT/US2012/049210 filed Aug. 1, 2012.
Written Opinion mailed Jan. 7, 2013 of PCT Application No. PCT/US2012/049210 filed Aug. 1, 2012.
International Search Report mailed Jan. 7, 2013 of PCT Application No. PCT/US2012/049213 filed Aug. 1, 2012.
Written Opinion mailed Jan. 7, 2013 of PCT Application No. PCT/US2012/049213 filed Aug. 1, 2012.
International Search Report mailed Jan. 17, 2013 of PCT Application No. PCT/US2012/049206 filed Aug. 1, 2012.
Written Opinion mailed Jan. 17, 2013 of PCT Application No. PCT/US2012/049206 filed Aug. 1, 2012.
Armand Wilson "Distributed Transactions and Two-Phase Committ," SAP White Paper, 2003 SAP AG, pp. 1-39.
Non-Final Office Action mailed Mar. 20, 2014, U.S. Appl. No. 13/564,147 by Lucas, J. filed Aug. 1, 2012.
Non-Final Office Action mailed Jun. 4, 2014, U.S. Appl. No. 13/564,242 by Lucas, J., filed Aug. 1, 2012.

* cited by examiner

GENERALIZED RECONCILIATION IN A DISTRIBUTED DATABASE

CLAIM OF PRIORITY

This application claims priority to U.S. Provisional Patent Application No. 61/513,932 entitled "Reconciling a Distributed Database from Hierarchical Viewpoints," which was filed on Aug. 1, 2011, the contents of which are expressly incorporated by reference herein.

CROSS-REFERENCE TO RELATED APPLICATION

This application is related to co-pending U.S. patent application Ser. No. 13/564,147, entitled "Reconciling a Distributed Database from Hierarchical Viewpoints," also by Jason Lucas, which was filed on Aug. 1, 2012, the contents of which are expressly incorporated by reference herein.

This application is related to co-pending U.S. patent application Ser. No. 13/564,242, entitled "Systems and Methods for Asynchronous Distributed Database Management," also by Jason Lucas, which was filed on Aug. 1, 2012, the contents of which are expressly incorporated by reference herein.

TECHNICAL FIELD

Embodiments of the present disclosure generally relate to database management techniques and, more particularly to generalized reconciliation in a distributed database.

BACKGROUND

A distributed database is a database in which storage devices are not all attached to a common central processing unit (CPU). A distributed database may be stored in multiple computers located in the same physical location, or may be dispersed over a network of interconnected computers at multiple physical locations. The locations or sites of a distributed system may be spread over a large area (such as the United States or the world) or over a small area (such as a building or campus). The collections of data in the distributed database can also be distributed across multiple physical locations.

Typically, it is an object of a distributed database system to allow many users (clients or applications) use of the same information within the collection of data at the same time while making it seem as if each user has exclusive access to the entire collection of data. The distributed database system should provide this service with minimal loss of performance (latency) and maximal transaction throughput. That is, a user at location A must be able to access (and perhaps update) data at location B. If the user updates information, the updates must be propagated throughout the resources of the distributed database system to maintain consistency in the distributed database system.

The updates (or database transactions) must be serialized in the distributed database system to maintain consistency. If transactions were executed in serial order, concurrency conflicts would never occur because each transaction would be the only transaction executing on the system at a given time and would have exclusive use of the system's resources. The new transactions would see the results of previous transactions, plus changes made by that transaction, but would never see the results of transactions that had not yet started. In operation, transactions typically execute concurrently and require simultaneous access and modification to the same resources. Thus, maintaining consistency in a distributed database system can be very complex and often results in unacceptable response times.

Various concurrency control schemes currently exist such as, for example, optimistic concurrency control schemes, which operate by detecting invalid use after the fact. The basic idea of these types of schemes is to divide a database transaction's lifetime into three phases: read, validate and publish. During the read phase, a transaction acquires resources without regard to conflict or validity, but it maintains a record of the set of resources it has used (a ReadSet) and the set of resources it has modified (a WriteSet). During the validation phase, the optimistic concurrency control scheme examines the ReadSet of the transaction and decides whether the current state of those resources has since changed. If the ReadSet has not changed, then the optimistic assumptions of the transaction are proved to have been right, and the system publishes the WriteSet, committing the transaction's changes. If the ReadSet has changes, then the optimistic assumption of the transaction are proved to be wrong, and the system aborts the transaction resulting in a loss of all changes.

In order to avoid the unnecessary abortion of transactions whose assumptions are proven to be wrong, prior art systems have been designed to reconcile incorrect assumptions. Unfortunately, to date, these mechanisms require that a specific reconciliation procedure be individually coded for each possible irresolvable event.

SUMMARY

Systems and methods for generalized consistency control of database transactions in a distributed database are described herein. As discussed above, in distributed database systems a specific reconciliation procedure is typically needed and coded for each possible irresolvable event. It is an object of the present disclosure to enable a general characterization of multiple types of irresolvable events and thus eliminate and/or reduce the need to write individual code for every specific irresolvable event.

In accordance with various embodiments, a database management system (DBMS) can generalize consistency control of database transactions in a distributed database by receiving a plurality of database transactions associated with a plurality of transaction sequences from a plurality of client systems in the distributed database system, wherein each transaction sequence indicates one or more uncommitted database transactions and each uncommitted database transaction includes one or more assertions that require consensus among a plurality of resources in the distributed database system to reconcile. The DBMS can detect an inconsistency among assertions associated with two or more uncommitted database transactions from two or more transaction sequences of the plurality of transaction sequences, wherein the inconsistency indicates a lack of consensus among the plurality of resources with respect to the validity of one or more of the assertions. The DBMS can process the two or more assertions associated with the two or more transaction sequences to generate a semantic preserving transform, wherein the semantic preserving transform, when applied to one or more of the two or more assertions, eliminates the inconsistency.

In one embodiment, the DBMS can generalize consistency control by reconciling the database transactions by applying the semantic preserving transform to the one or more of the assertions.

In one embodiment, the semantic preserving transform indicates a modification that, when applied to the one or more assertions, eliminates the inconsistency.

In one embodiment, the two or more transaction sequences of the plurality of transaction sequences are reconciled into a global transaction sequence.

In one embodiment, the DBMS can generalize consistency control by processing a set of rules to generate the semantic preserving transform. The set of rules can comprise generalized instructions for processing the two or more assertions associated with the two or more transactions sequences to generate the semantic preserving transform.

In one embodiment, the DBMS can generalize consistency control by sending a message to one or more of the client systems associated with the two or more assertions associated with the two or more transaction sequences to solicit user input for resolving the inconsistency, and receiving a response indicating the user input.

In one embodiment, the DBMS can generalize consistency control by processing the user input and the two or more assertions associated with the two or more transaction sequences to generate the semantic preserving transform.

In one embodiment, the resources comprise other database management systems in the distributed database system or storage management systems in the distributed database system.

In accordance with various embodiments, a DBMS can generalize consistency control of database transactions in a distributed database by detecting an inconsistency among assertions associated with two or more database transactions from two or more transaction sequences of a plurality of transaction sequences, wherein the inconsistency indicates a lack of consensus among the plurality of resources with respect to the validity of one or more of the assertions. The DMBS can process the two or more assertions associated with the two or more transaction sequences to generate a semantic preserving transform, wherein the semantic preserving transform, when applied to one or more of the two or more assertions, eliminates the inconsistency. The DBMS can reconcile the uncommitted database transactions by applying the semantic preserving transform to the one or more assertions.

In accordance with various embodiments, a DBMS can generalize consistency control of database transactions in a distributed database. The DBMS can include a processing unit, an interface, and a memory unit. The interface can be configured to receive a plurality of database transactions associated with a plurality of transaction sequences from a plurality of client systems in the distributed database system, wherein each transaction sequence indicates one or more uncommitted database transactions and each uncommitted database transaction includes one or more assertions that require consensus among a plurality of resources in the distributed database system to reconcile. The memory unit can have instructions stored thereon, wherein the instructions, when executed by the processing unit, cause the processing unit to detect an inconsistency among assertions associated with two or more uncommitted database transactions from two or more transaction sequences of the plurality of transaction sequences, and process the two or more assertions associated with the two or more transaction sequences to generate a semantic preserving transform, wherein the semantic preserving transform, when applied to one or more of the two or more assertions, eliminates the inconsistency.

DETAILED DESCRIPTION

Figure 1:
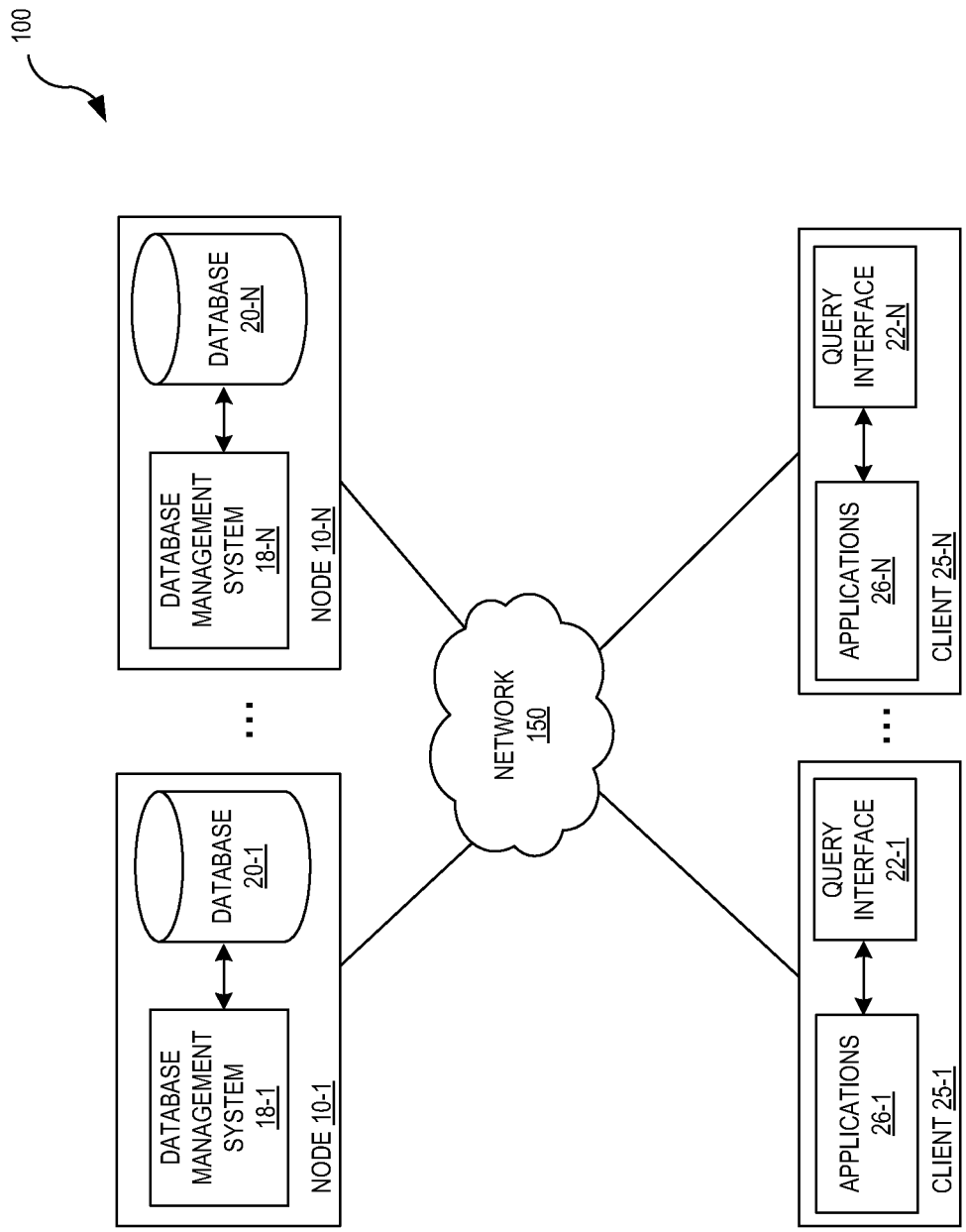
FIG. 1 depicts a block diagram of an example distributed database environment illustrating a plurality of distributed database sites and client systems within which various features of the present invention may be utilized, according to one embodiment.

The systems and methods disclosed provide for generalized consistency control of database transactions in a distributed database. As discussed above, in distributed database systems a specific reconciliation procedure is typically needed and coded for each possible irresolvable event. It is an object of the present disclosure to enable a general characterization of multiple types of irresolvable events and thus eliminate and/or reduce the need to write individual code for every specific event.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

Embodiments of the present disclosure may be provided as a computer program product, which may include a machine-readable medium having stored thereon instructions, which may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), field programmable gate arrays (FPGAs), application-specific integrated circuits (ASICs), vehicle identity modules (VIMs), magnetic or optical cards, flash memory, or other type of media/machine-readable medium suitable for storing electronic instructions.

Moreover, embodiments of the present invention may also be downloaded as a computer program product or data to be used by a computer program product, wherein the program, data, and/or instructions may be transferred from a remote computer or mobile device to a requesting computer or mobile device by way of data signals embodied in a carrier wave or other propagation medium via a communication link (e.g., a modem or network connection). In some cases, parts of the program, data, or instructions may be provided by external networks such as the telephony network (e.g., Public Switched Telephony Network, cellular, Wi-Fi, and other voice, data, and wireless networks) or the Internet. The communications link may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks.

Terminology

Brief definitions of terms used throughout this application are given below.

The terms "connected" or "coupled" and related terms are used in an operational sense and are not necessarily limited to a direct connection or coupling.

The term "embodiments," phrases such as "in some embodiments," "in various embodiments," and the like, generally mean the particular feature(s), structure(s), method(s), or characteristic(s) following or preceding the term or phrase is included in at least one embodiment of the present invention, and may be included in more than one embodiment of the present invention. In addition, such terms or phrases do not necessarily refer to the same embodiments.

If the specification states a component or feature "may", "can", "could", or "might" be included or have a characteristic, that particular component or feature is not required to be included or have the characteristic.

The term "module" refers broadly to a software, hardware, and/or firmware (or any combination thereof) component. Modules are typically functional components that can generate useful data or other output using specified input(s). A module may or may not be self-contained. An application program (also called an "application") may include one or more modules, and/or a module can include one or more application programs.

The term "responsive" includes completely and partially responsive.

Example Distributed Database Environment

An example of a distributed database environment 100, representing a plurality of distributed database sites and client systems, within which various features of the present invention may be utilized, will now be described with reference to FIG. 1. In this example, the distributed database environment 100 comprises a plurality of nodes 10, a plurality of client systems 25, and a network 150. Each node 10 may be located at a different site or geographic location. Similarly, each client system 25 may be located anywhere within connectivity of network 150.

In this example, the nodes 10 are in communication with other nodes 10 via network 150. The nodes 10 may be centralized database systems such as data warehouses or data marts, remote sites such as desktop personal computers, portable computers or other mobile computing devices, or any other type of data processors. As shown in this example, the nodes 10 include database management systems 18 in communication with distributed databases 20. The database management systems 18 may be in communication with a database 20 via any communication means for communicating data and/or control information. Although not shown for simplicity, database management system 18 may also include both a distributed database management system and a local database management system. Similarly, although not shown, database 20 may include both a distributed database and a local database.

In some embodiments, one or more of the database distributed database management systems 18 may be designated the master management system or host server system. The master management system may, in some cases, be responsible for reconciling database transactions and/or database transaction sequences as disclosed herein; although alternative configurations are possible.

The network 150, over which client systems 25 and nodes 10 communicate, may be a local area network, a metropolitan area network, a wide area network, a global data communications network such as the Internet, a private "intranet" or "extranet" network or any other suitable data communication medium—including combinations or variations thereof. For example, the Internet can provide file transfer, remote log in, email, news, RSS, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

Alternatively or additionally, the network 150 can be any collection of distinct networks operating wholly or partially in conjunction to provide connectivity to the client systems 25 and nodes 10 and may appear as one or more networks to the serviced systems and devices. In one embodiment, communications to and from client systems 25 can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more wireless networks, such as, but is not limited to, one or more of a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G networks, enhanced data rates for GSM evolution (EDGE), General packet radio service (GPRS), enhanced GPRS, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

The client systems (or clients) 25 are in communication with one or more nodes 10 via network 150. Client systems 25 can be any system and/or device, and/or any combination of devices/systems that is able to establish a connection with another device, a server and/or other systems. The client systems 25 typically include display or other output functionalities to present data exchanged between the devices to a user. For example, the client systems 25 can be, but are not limited to, a server desktop, a desktop computer, a computer cluster, a mobile computing device such as a notebook, a laptop computer, a handheld computer, a mobile phone, a smart phone, a PDA, a Blackberry device, a Treo, and/or an iPhone, etc. In one embodiment, client systems 25 are coupled to the network 150. In some embodiments, the client systems 25 may be directly connected to one another or to nodes 10.

The client systems 25 include a query interface 22 and one or more applications 26. An application 25 may execute on client 25 and may include functionality for invoking query interface 22 for transferring a database query to a database server for processing. The application 26 may invoke the query interface 22 for reading data from or writing data to a database table of a distributed database 20. In general, application 26 and query interface 22 may be any type of interpreted or executable software code such as a kernel component, an application program, a script, a linked library, or an object with method, including combinations or variations thereof. In one example, the application 26 comprises a multi-user interactive game; however, it is appreciated that other applications are also possible.

In some embodiments, one or more of the database management systems 18 maintain one or more transaction sequences for each client system 25 by asynchronously and concurrently reconciling the database transactions. The transaction sequences can comprise one or more database transactions. In operation, the database transactions may be generated by an application 26 within client system 25 and transferred to the associated database management system 18 via a query generated by query interface 22. As shown in the example of FIG. 1, the query is transferred over network 150 and received at one of the database management systems 18.

In some embodiments, each transaction sequence may be a continuous independent sequence or a linear time model that indicates database transactions from a personal point of view. The personal point of view may be, for example, the point of view of one or more applications running on a client and/or the point of view of a client system or an operator (e.g., user or player) of the client system.

In some embodiments, the transaction sequences may be represented by a graph such as a causality graph or a serialization graph. Causality graphs and serialization graphs contain information about current and historic database transactions or operations, such as database queries received from a client system.

In some embodiments, the database management system 18 maintains the associated transaction sequences for the client systems 25 and asynchronously and concurrently reconciles the database transactions within the transaction sequences with other relevant database transactions in other transactions sequences received within the distributed database system.

In some embodiments, each database transaction operates with a set of assumptions upon which the database transaction relies. As described herein, the assumptions are controlled with assertions that can be used in lieu of locks to permit interleaving of operations and increased concurrency. In some embodiments, the assertions enforce consistency using various mechanisms such as, for example, a multi-version concurrency control (MVCC) mechanism. As described herein, the concurrency control mechanisms facilitate the ability to seek a time in the past during which assertions are true. This process is referred to herein as "time traveling," and is discussed in greater detail with reference to FIG. 5.

In some embodiments, database 20 includes a global transaction sequence containing the committed database transactions. In some embodiments, the global transaction sequence is replicated across some or all of the databases 20 in the distributed database environment 100.

Figure 2:
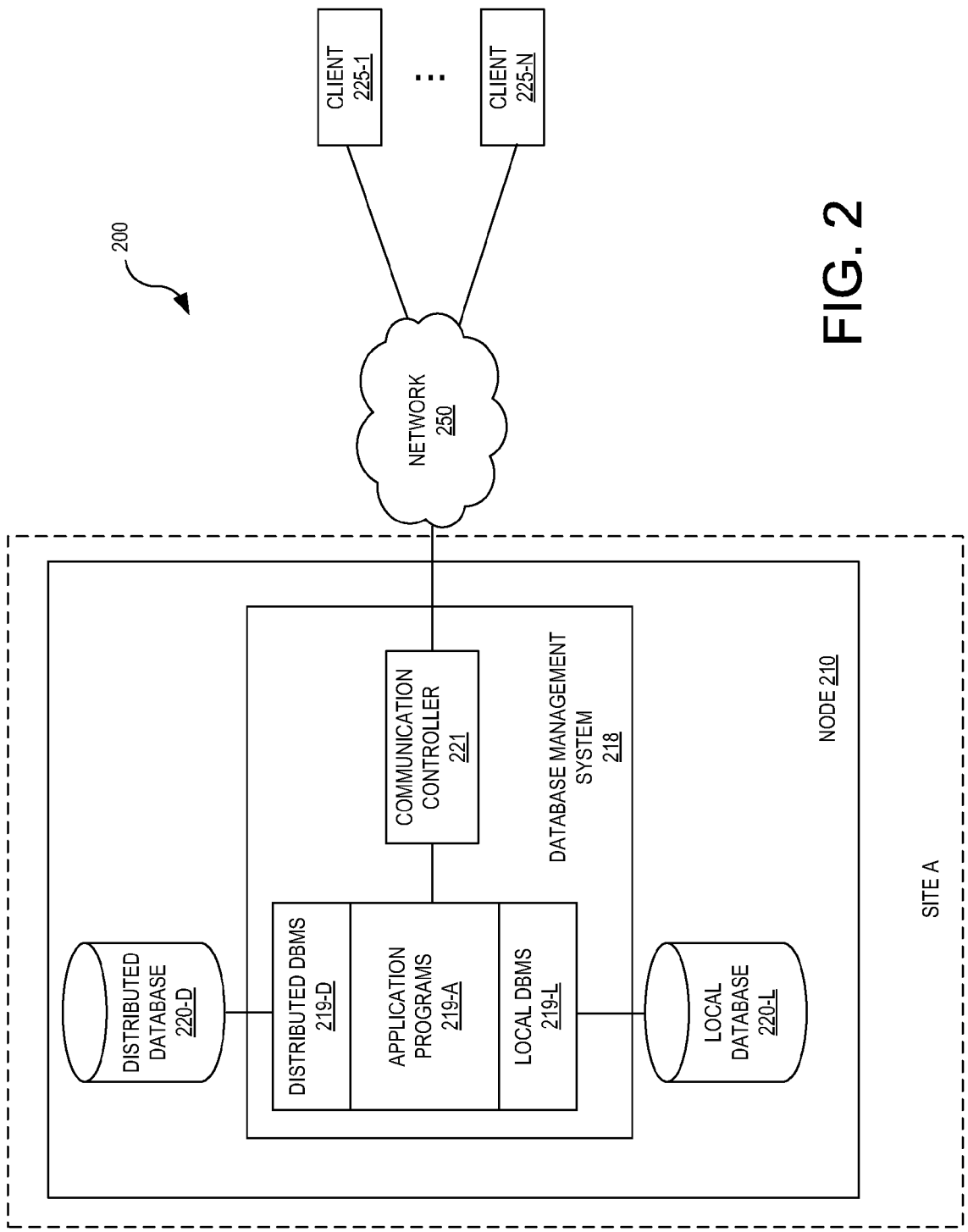
FIG. 2 depicts a block diagram of an example node in a distributed database environment within which various features of the present invention may be utilized, according to an embodiment.

FIG. 2 depicts a block diagram of an example node 210 in a distributed database environment 200, according to an embodiment. The distributed database environment 200 may be similar to the distributed database environment 100 of FIG. 1, although alternative configurations are possible.

In this example, node 210 includes a database management system 218 in communication with databases 220-D and 220-L (distributed and local, respectively), and a network 250. The network 250 may be any network such as, for example, network 150 of FIG. 1. The node 210 may be similar to the nodes 10 of FIG. 1; although alternative configurations are possible. In some embodiments, while each node includes a local database management system 219-L, only one master distributed database system 219-D exists. In this case, the distributed database system 219-D controls the interaction across database.

The database management system 218 further includes a distributed database management system 219-D, a local database management system 219-L, optional application programs 219-A. The distributed database management system 219-D coordinates access to the data at the various nodes. The distributed database management system 219-D may perform some or all of the follow functions:

Keep track of where data is located in a distributed data dictionary. This includes presenting one logical database and schema to developers and users.

Determine the location from which to retrieve requested data and the location at which to process each part of a distributed query without any special actions by the developer or user.

If necessary, translate the request at one node using a local DBMS into the proper request to another node using a different DBMS and data model and return data to the requesting node in the format accepted by that node.

Provide data management functions such as security, concurrency and deadlock control, global query optimization, and automatic failure recording and recovery.

Provide consistency among copies of data across the remote sites (e.g., by using multiphase commit protocols).

Present a single logical database that is physically distributed. One ramification of this view of data is global primary key control, meaning that data about the same business object are associated with the same primary key no matter where in the distributed database the data are stored, and different objects are associated with different primary keys.

Be scalable. Scalability is the ability to grow, reduce in size, and become more heterogeneous as the needs of the business change. Thus, a distributed database must be dynamic and be able to change within reasonable limits without having to be redesigned. Scalability also means that there are easy ways for new sites to be added (or to subscribe) and to be initialized (e.g., with replicated data).

Replicate both data and stored procedures across the nodes of the distributed database. The need to distribute stored procedures is motivated by the same reasons for distributing data.

Transparently use residual computing power to improve the performance of database processing. This means, for example, the same database query may be processed at different sites and in different ways when submitted at different times, depending on the particular workload across the distributed database at the time of query submission.

Permit different nodes to run different DBMSs. Middleware (see Chapter 9) can be used by the distributed DBMS and each local DBMS to mask the differences in query languages and nuances of local data.

Allow different versions of application code to reside on different nodes of the distributed database. In a large organization with multiple, distributed servers, it may not be practical to have each server/node running the same version of software.

In one embodiment, each node includes both a local database system 219-L and a distributed database management system 219-D. In the example of FIG. 2, each site has a local DBMS 219-L that manages the local database 220-L stored at that site and a copy of the distributed DBMS database 220-D and the associated distributed data dictionary/directory (DD/D). The distributed DD/D contains the location of all data in the network, as well as data definitions.

Requests for data by users or application programs are first processed by the distributed DBMS 219-D, which determines whether the transaction is local or global. A local transaction is one in which the required data are stored entirely at the local site. A global transaction requires reference to data at one or more non-local sites to satisfy the request. For local transactions, the distributed DBMS 219-D passes the request to the local DBMS 219-L. For global transactions, the distributed DBMS 219-D routes the request to other sites as necessary. The distributed DBMSs at the participating sites exchange messages as needed to coordinate the processing of the transaction until it is completed (or aborted, if necessary).

Figure 3:
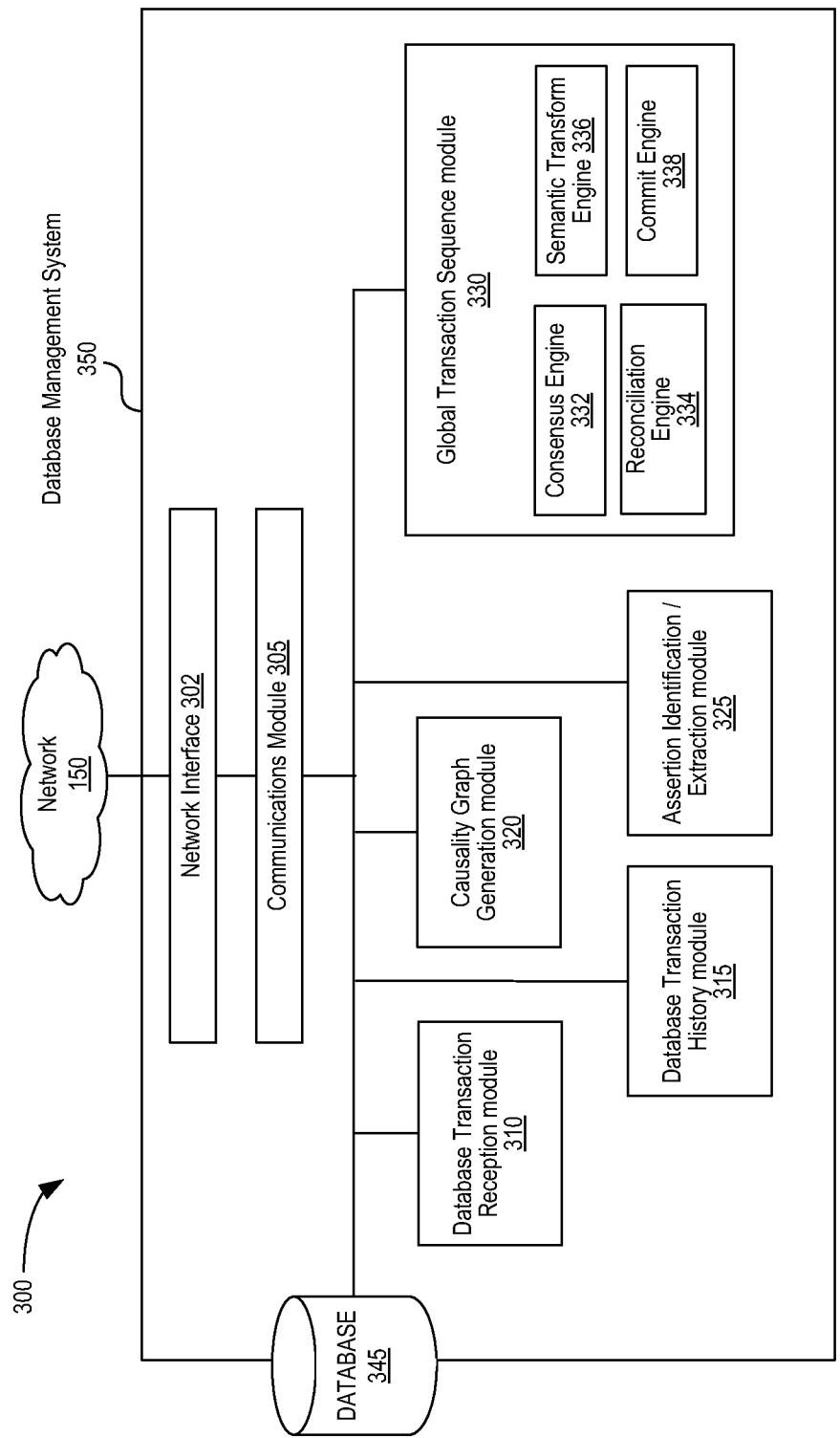
FIG. 3 depicts a block diagram of the components of a database management system for controlling transaction consistency in a distributed database system using a semantic preserving transform, according to an embodiment.

FIG. 3 depicts a block diagram of the components of a database management system 350 for maintaining transaction consistency in a distributed database system using a semantic preserving transform, according to an embodiment. The database management system 350 may be the database management system 18 of FIG. 1, although alternative configurations are possible.

The database management system 350 includes a network interface 302, a communications module 305, a database transaction reception module 310, a database transaction history module 315, a causality graph generation module 320, an assertion identification/extraction module 325, and a global transactions sequence module 330. In one embodiment, the database management system 350 is also coupled to a database 345. The database 345 can be the database 20 of FIG. 1, although alternative configurations are possible. Additional or less modules can be included without deviating from the novel art of this disclosure. Furthermore, each module in the example of FIG. 3 can include any number and/or combination of sub-modules and/or systems, implemented with any combination of hardware and/or software.

The database management system 350, although illustrated as comprised of distributed components (physically distributed and/or functionally distributed), could be implemented as a collective element. In some embodiments, some or all of the modules, and/or the functions represented by each of the modules can be combined in any convenient or known manner. Furthermore, the functions represented by the modules can be implemented individually or in any combination thereof, partially or wholly, in hardware, software, or a combination of hardware and software.

In the example of FIG. 3, the network interface 302 can be a networking device that enables the database management system 350 to mediate data in a network with an entity that is external to the database management system 350, through any known and/or convenient communications protocol supported by the host and the external entity. The database management system 350 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

One embodiment of the database management system 350 includes the communications module 305. The communications module 305 can be any combination of software agents and/or hardware modules able to identify, detect, track, manage, receive, record, and/or process data access requests. The communications module 305, when in operation, is able to communicate with the network interface 302 to identify, detect, track, manage, receive, record, and/or process data access requests including, but not limited to, database queries and/or database transactions from client systems and/or other nodes in the distributed database system.

One embodiment of the database management system 350 includes the database transaction reception module 310. The database transaction reception module 310 can be any combination of software agents and/or hardware components able to receive and process data requests from the client devices and other nodes. For example, the database transaction reception module 310 is configured to receive and process database queries from the client devices and other data request from other nodes in the system. The database transaction reception module 310 may then segment, route, and/or otherwise process the requests and/or identify the database transactions with the data requests or queries.

One embodiment of the database management system 350 includes the database transaction history module 315. The database transaction history module 315 can be any combination of software agents and/or hardware components able to track and store historical transactions. For example, the history may include transaction order, assumptions/assertions relied upon, etc. Advantageously, schemas do not need to include histories because the database keeps track of this information.

One embodiment of the database management system 350 includes the causality graph generation module 320. The causality graph generation module 320 can be any combination of software agents and/or hardware components able to interact with the transaction history module 315 to generate a causality graph for one or more database transactions in or indicated by a transaction sequence. For example, the causality graph generation module 320 can identify transaction sequences based on received database queries. As discussed, the database queries indicate one or more database transactions. The causality graph generation module 320 can use the database transaction information to interact with the database transaction history module 315 in order to identify the historical transactions upon which the current database transaction relies and build a causality graph based on this history information.

In one embodiment, the causality graph generation module 320 generates a causality graph indicating the one or more assertions upon which each database transaction relies. For example, in some embodiments, concurrency control schemes control concurrency by detecting invalid use after the fact. These concurrency controls may divide a transaction's existence into read, validate and publish phases. During the read phase, the scheme acquires assumptions from one or more distributed database resources regarding the underlying values of the assumptions upon which the transaction relies without regard to conflict or validity of those assumptions. The transaction sequences themselves and/or the database transaction history module may indicate the set of resources and/or assumptions relied upon for each database transaction in transaction sequence. In some embodiments, assertions may be, for example, database key values; although alternative configurations are possible.

One embodiment of the database management system 350 includes the assertion identification/extraction module 325. The assertion identification/extraction module 325 can be any combination of software agents and/or hardware components able to identify and/or extract the assertions associated with one or more database transactions. For example, the assertion identification/extraction module 325 may process database transactions, transaction sequences, and/or database queries to identify and/or extract the underlying assertions upon which the database transactions rely.

In one embodiment, each database transaction operates with a set of assumptions on which the database transaction relies. As described herein, the assumptions are controlled with assertions that can be used in lieu of locks to permit interleaving of operations and increased concurrency. The assertions can enforce consistency using various mechanisms such as, for example, a multi-version concurrency control (MVCC) mechanism as described herein.

One embodiment of the database management system 350 includes the global transaction sequence module 330. The global transaction sequence module 330 can be any combination of software agents and/or hardware components able to maintain, reconcile, and commit database transactions to a global transaction sequence. The global transaction sequence module 330 may maintain, reconcile, and commit database transactions from individual transaction sequences (e.g., from private sequences). In this example, the global transaction sequence module 330 includes a consensus engine 332, a reconciliation engine 334, a semantic transform engine 336, and a commit engine 338.

In one embodiment the consensus engine 332 is configured to achieve consensus among a plurality of database resources of the distributed database system regarding the validity of each assertion. The plurality of resources or system may comprise, for example, nodes or database management systems in the distributed database system. In one embodiment, the systems and methods described herein can operate according to the CAP theorem, also known as Brewer's theorem. The CAP theorem states that it is impossible for a distributed computer system to simultaneously guarantee consistency, availability, and partition tolerance.

Consistency guarantees that all nodes of the distributed database see the same data at the same time. Availability guarantees that every request receives a response about whether the request was successful or failed. Partition tolerance guarantees that the system continues to operate despite arbitrary message loss. According to the CAP theorem, a distributed system can satisfy any two of the above guarantees at the same time, but not all three.

There are certain limitations on database system that maintain a distributed scalable state due, at least in part, to unreliable processors. One solution is allowing consensus. Consensus is the process of agreeing on a single result among a group of participants (or resources). Consensus protocols are the basis for the state machine approach to distributed computing. The state machine approach is a technique for converting an algorithm into a fault-tolerant, distributed implementation. Every potential fault must have a way to be dealt with and ad-hoc techniques often leave important cases of failures unresolved.

In some embodiments, the systems and methods described herein use consensus protocols such as, for example, the Paxos algorithm. The Paxos algorithm describes protocols for solving consensus in a network of unreliable processors. This problem becomes difficult when the participants or their communication medium experience failures. The Paxos approach provides a technique to ensure that all cases are handled safely. However, these cases may still need to be individually coded.

The Paxos protocols define a number of roles and describes the actions of the processes by their roles in the protocol: client, acceptor, proposer, learner, and leader. In typical implementations, a single processor may play one or more roles at the same time. This does not affect the correctness of the protocol—it is usual to coalesce roles to improve the latency and/or number of messages in the protocol.

The Paxos protocols include a spectrum of trade-offs between the number of processors, number of message delays before learning the agreed value, the activity level of individual participants, number of messages sent, and types of failures. However, no fault-tolerant consensus protocol can guarantee progress.

Clients: Clients issue requests to the distributed system, and wait for a response. For instance, a write request on a file in a distributed file server. Acceptors: Acceptors act as the fault-tolerant "memory" of the protocol. Acceptors are collected into groups called Quorums. Any message sent to an Acceptor must be sent to a Quorum of Acceptors, and any message received from an Acceptor is ignored unless a copy is received from each Acceptor in a Quorum. Proposers: Proposers advocate a client request, attempt to convince the Acceptors to agree on it, and act as a coordinator to move the protocol forward when conflicts occur. Learners: Learners act as the replication factor for the protocol. Once a Client request has been agreed on by the Acceptors, the Learner may take action (i.e., execute the request and send a response to the client). To improve availability of processing, additional Learners can be added. Leaders: Leaders are distinguished Proposers that are required to make progress. Many processes may believe they are leaders, but the protocol only guarantees progress if one of them is eventually chosen. If two processes believe they are leaders, it is possible to stall the protocol by continuously proposing conflicting updates. The safety properties are preserved regardless.

In one embodiment the reconciliation engine 334 is configured to maintain the global transaction sequence by continuously and asynchronously reconciling the plurality of transaction sequences. For example, the reconciliation engine 334 may reconcile database transactions according to the underlying assertions. That is, the assertions can be used in lieu of locks to permit interleaving of database transactions and increase concurrency.

In one embodiment the semantic transform engine 336 is configured to process assertions associated with transaction sequences to generate a semantic preserving transform. The semantic preserving transform may be generated in response to identifying one or more inconsistencies among assertions in one or more database transactions. Advantageously, the semantic preserving transform can be utilized to reconcile otherwise irreconcilable assertions. That is, when the semantic preserving transform is applied to one or more of the otherwise irreconcilable assertions, the transform eliminates the inconsistency providing for reconciliation and thus serialization of the database transactions. Examples of generation and application of the semantic preserving transform is discussed in greater detail with respect to FIG. 6A-6C.

In one embodiment the commit engine 338 is configured to commit database transactions to the global transaction sequence. To ensure data integrity for real-time, distributed update operations, the cooperating transaction managers can execute a commit protocol. The commit protocol is a well-defined procedure (involving an exchange of messages) to ensure that a global transaction is either successfully completed at each site or else aborted.

The most widely used protocol is called a two-phase commit. A two-phase commit protocol ensures that concurrent transactions at multiple sites are processed as though they were executed in the same, serial order at all sites. A two-phase commit works in two phases. To begin, the site originating the global transaction or an overall coordinating site sends a request to each of the sites that will process some portion of the transaction. Each site processes the subtransaction (if possible), but does not immediately commit (or store) the result to the local database. Instead, the result is stored in a temporary file. Additionally, each site locks (or prohibits others from updating) its portion of the database being updated and notifies the originating site when it has completed its subtransaction. When all sites have responded, the originating site now initiates the two-phase commit protocol.

In a prepare phase, a message is broadcast to every participating site (or node), asking whether that site is willing to commit its portion of the transaction at that site. Each site returns an "OK" or "not OK" message. An "OK" indicates that the remote site promises to allow the initiating request to govern the transaction at the remote database. Next, in a commit phase, the originating site collects the messages from all sites. If all are "OK," it broadcasts a message to all sites to commit the portion of the transaction handled at each site. However, if one or more responses are "not OK," it broadcasts a message to all sites to abort the transaction.

A limbo transaction can be identified by a timeout or polling. With a timeout (no confirmation of commit for a specified time period), it is not possible to distinguish between a busy or failed site. Polling can be expensive in terms of network load and processing time. With a two-phase commit strategy for synchronizing distributed data, committing a transaction is slower than if the originating location were able to work alone.

One embodiment of the database management system 350 includes the database 345. The database 345 can store any data items/entries including, but not limited to, software, descriptive data, images, system information, drivers, and/or any other data item utilized by the database management system and/or any other systems for operation. The database 345 may be coupled to the database management system 350. The database 345 may be managed by a database management system (DBMS), for example but not limited to, Oracle, DB2, Microsoft Access, Microsoft SQL Server, PostgreSQL, MySQL, FileMaker, etc. The user data repository 128 can be implemented via object-oriented technology and/or via text files, and can be managed by a distributed database management system, an object-oriented database management system (OODBMS) (e.g., ConceptBase, FastDB Main Memory Database Management System, JDOInstruments, ObjectDB, etc.), an object-relational database management system (ORDBMS) (e.g., Informix, OpenLink Virtuoso, VMDS, etc.), a file system, and/or any other convenient or known database management package.

Figure 4:
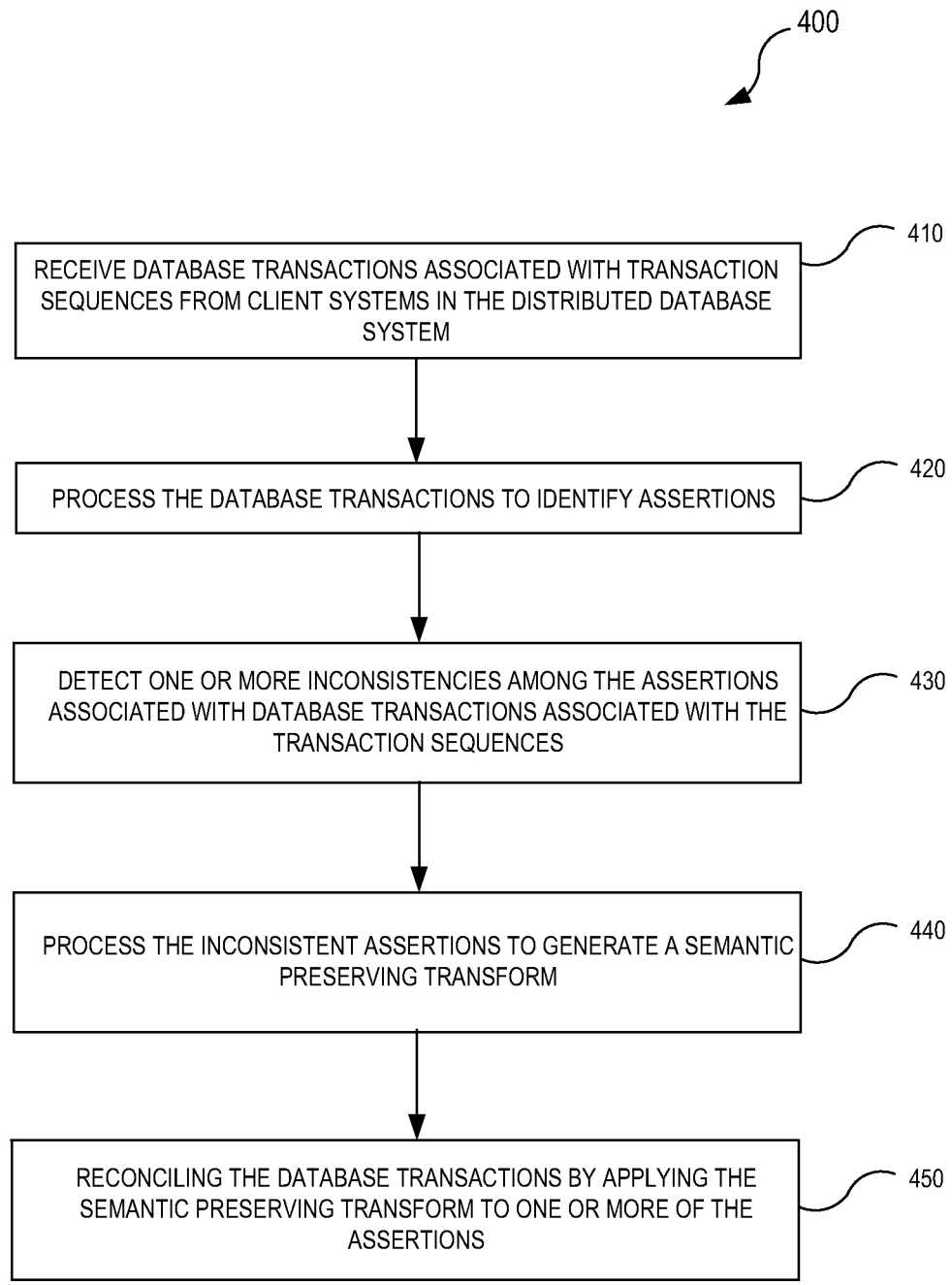
FIG. 4 depicts a flow diagram illustrating an example process for controlling transaction consistency in a distributed database system using a semantic preserving transform, according to an embodiment.

FIG. 4 depicts a flow diagram illustrating an example process 400 for controlling transaction consistency in a distributed database system using a semantic preserving transform, according to an embodiment. One or more database management systems, such as, for example, the database management systems 18 of FIG. 1, among other functions, control transaction consistency including maintaining and/or reconciling database transaction in the distributed database system. In one embodiment, each transaction sequence indicates one or more uncommitted database transactions and each uncommitted database transaction includes one or more assertions that require consensus among a plurality of resources in the distributed database system to reconcile.

In operation 410, the database management system receives database transactions associated with transaction sequences from client systems in the distributed database system. For example, the database management system may receive a plurality of database transactions associated with a plurality of transaction sequences from a plurality of client systems in the distributed database system. Each transaction sequence can indicate one or more uncommitted database transactions and each uncommitted database transaction can include one or more assertions that require consensus among a plurality of resources in the distributed database system to reconcile.

In one embodiment, the database transactions may be received as a result of one or more client queries that include the one or more database transactions. In some embodiments, a database query can indicate one or more database transactions initiated by an application running on one of a plurality of clients in the distributed database system. The database queries can be received at any number of database management systems in the distributed database system; however, the example of FIG. 4 is discussed with reference to a single database management system.

In some embodiments, each transaction sequence may be a continuous independent sequence or a linear time model that indicates database transactions from a personal point of view or the point of view of one or more applications running on a client. The personal point of view may be, for example, the point of view of a client system or an operator of the client system.

In some embodiments, the transaction sequences may be represented by a graph such as a causality graph or a serialization graph. Causality graphs and serialization graphs contain information about current and historic database transactions or operations, such as database queries received from a client system.

In some embodiments, serialization graph algorithms (SGAs) control the concurrent operation of temporally overlapping transactions by computing an equivalent serial ordering. SGAs try to "untangle" a convoluted sequence of operations by multiple transactions into a single cohesive thread of execution. SGAs function by creating a serialization graph. The nodes in the graph correspond to transactions in the system. The arcs of the graph correspond to equivalent serial ordering. As arcs are added to the graph, the algorithms look for cycles. If there are no cycles, then the transactions have an equivalent serial order and consistency is assured. If a serialization cycle were found, however, then consistency would be compromised if all transactions in the cycle were allowed to commit. In this case, the SGA would restore consistency by aborting one or more of the transactions forming the cycle.

In some embodiments, each causality graph represents the point of view of a client system, and thus the transaction sequence indicates all transaction initiated from that client. In other embodiments, each client system may have any number of associated transaction sequences. For example, a causality graph may represent the database transactions as perceived from an individual player of an online interactive game. Thus, the individual transaction sequences provide for the ability to eventually overlap database transactions by temporarily (during the read phase) taking into consideration only those database transactions relevant to that individual transaction sequence.

In an identification operation 420, the database management system processes the database transactions to identify the assertions that require consensus among a plurality of resources in the distributed database system to reconcile. As discussed above, database transaction can include one or more assertions upon which the transaction relies upon.

In a detection operation 430, the database management system detects one or more inconsistencies among the assertions associated with database transactions associated with the transaction sequences. For example, the database management system may detect an inconsistency among assertions associated with two or more uncommitted database transactions from two or more transaction sequences of the plurality of transaction sequences. The inconsistency can indicate a lack of consensus among the plurality of resources with respect to the validity of one or more of the assertions.

In a generation operation 440, the database management system processes the inconsistent assertions to generate a semantic preserving transform. For example, the database management system can process the two or more assertions associated with the two or more transaction sequences to generate a semantic preserving transform. The semantic preserving transform, when applied to one or more of the two or more assertions, eliminates the inconsistency.

In one embodiment, the semantic preserving transform indicates a modification to the inconsistent assertions that, when applied to the one or more assertions, eliminates the inconsistency.

In one embodiment, the semantic preserving transform is generated based on and/or using a set of rules to generate the semantic preserving transform. The set of rules can comprise generalized instructions for processing inconsistent assertions associated with two or more transactions sequences.

Lastly, in a reconciliation operation 450, the database management system, reconciles the database transactions by applying the semantic preserving transform to one or more of the inconsistent assertions. Advantageously, otherwise inconsistent assertions can be reconciled even if a specific reconciliation procedure does not exist.

Figure 5:
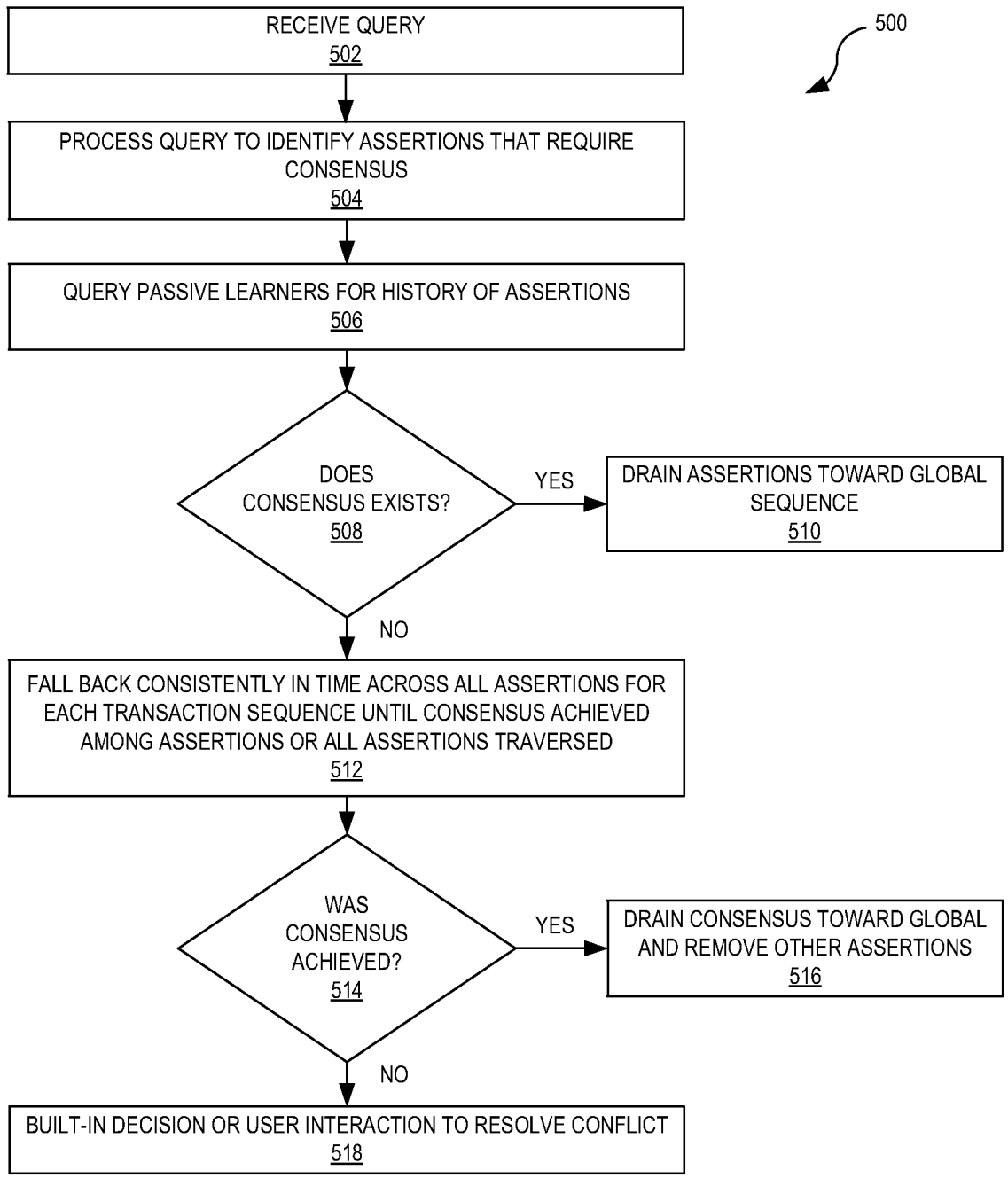
FIG. 5 depicts a flow diagram illustrating an example process for controlling transaction consistency in a distributed database system using a semantic preserving transform, according to one embodiment.

FIG. 5 depicts a flow diagram illustrating an example process 500 for controlling transaction consistency in a distributed database system using a semantic preserving transform, according to one embodiment. One or more database management systems, such as, for example, the database management systems 18 of FIG. 1, among other functions, control, reconciles, and/or otherwise maintains the transaction consistency in the distributed database system by generating and applying semantic preserving transforms.

In operation 502, a database management system receives a query from a client system. The query can indicate one or more database transactions initiated by an application running on the client system. The distributed database system can receive any number of queries from any number of applications running on any number of client systems in the distributed database system; however, operation and handing of a single query is discussed in the example process 500.

In operation 504, the database management system processes the query to identify one or more assertions that require consensus among a plurality of machines (i.e., database resources or database management systems) within the distributed database in order to reconcile.

In operation 506, the database management system queries passive learners in the system to identify a history of the assertions as perceived from the passive learners. In some embodiments, the history of the assertions from the perspective of each of the passive learners represents, for example, the value they believe a database key to be for a time series (before and/or after specific database transactions). The history of changes to the assertion is kept by the passive learners so that the system can eventually determine the last time that there was a consensus among the machines (or database resources) on the value of an assertion or database key. This is discussed in greater detail with respect to operation 512.

In operation 508, the database management system determines whether or not a consensus exists among the resources with respect to the assertions relied upon by the one or more database transactions indicated in the query. If a consensus exists then, in operation 510, the assertions can be drained into or toward the next transaction sequence at the next (or a higher) hierarchical level. In some cases, the next transaction sequence is a shared transaction sequence; however, the next transaction sequence may also be a global transaction sequence that is replicated across all of the machines in the distributed database system.

If a consensus does not exist then, in operation 512, the database management system falls back consistently across all assertions in the history of the passive learners until a consensus can be achieved. This process is referred to herein as "time traveling." In operation 514, the system determines whether or not consensus is achieved among the resources with respect to the assertions relied upon by the one or more database transactions indicated in the query. If a consensus is achieved during the time traveling, then in operation 516 the database transactions that have a consensus are drained toward the next sequence and the other transaction sequences are removed.

If a consensus is not achieved through the "time traveling" process, then in process 522, the database management system applies a built-in generalized reconciliation procedure as described herein. Advantageously, the otherwise irreconcilable database transaction changes are not immediately thrown out if an inconsistency among the assertions is detected. In some embodiments, user interaction may be used to resolve the conflict. For example, the database management system may query or otherwise solicit feedback from a user to resolve a conflict.

Figure 6A:
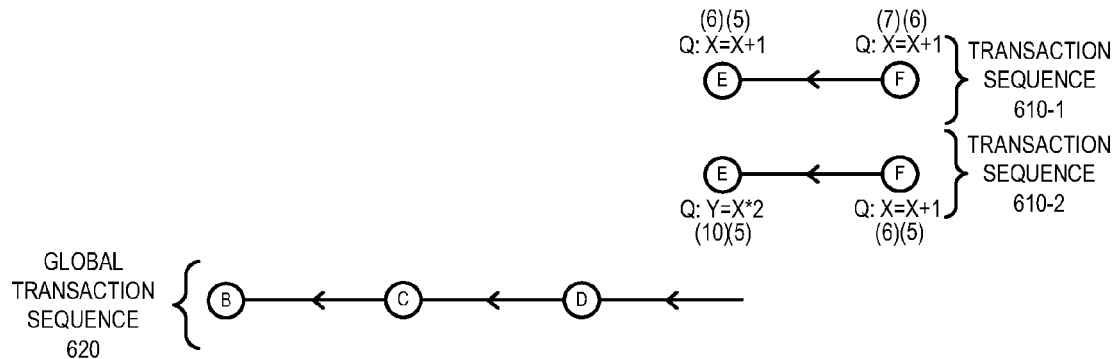
FIGS. 6A-6C depict example diagrams illustrating generalized reconciliation among a plurality of transaction sequences in a distributed database system, according to an embodiment.
Figure 6B:
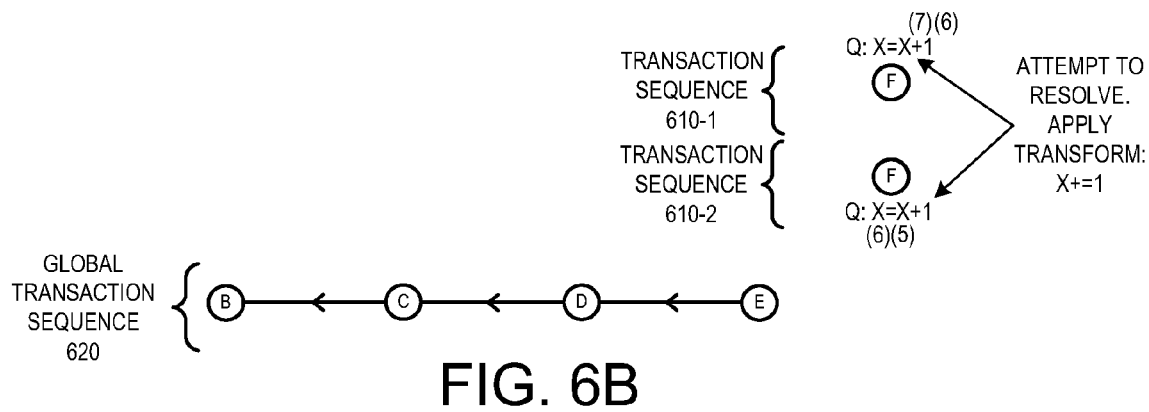
Figure 6C:
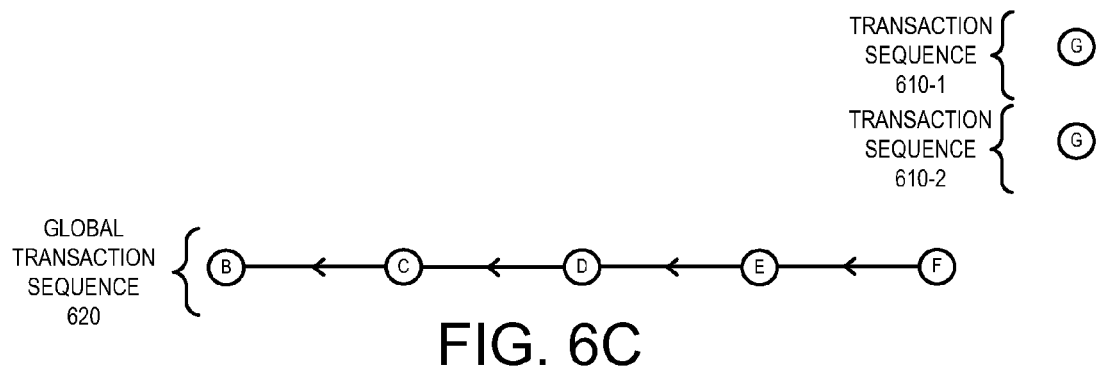

FIGS. 6A-6C depict example diagrams illustrating generalized reconciliation among a plurality of transaction sequences in a distributed database system, according to an embodiment. More specifically, FIGS. 6A-6C illustrate the process of reconciliation of two transaction sequences by generating and applying an appropriate semantic preserving transform to the underlying assertions.

In some embodiments, transaction sequences 610 include database transactions that rely on underlying assertions that must be validated prior to committing the changes to a global transaction sequence or an intermediate shared transaction sequence (not shown).

FIG. 6A illustrates an example of reconciling database transactions when an inconsistency occurs among one or more of the underlying assertions upon which the database transactions rely. In this example, transaction sequences 610-1 and 610-2 acquire a value or state of "X" during the read phase. Database transaction E then performs a transaction which relies on the value or state of "X." In particular, in this example, at database transaction E, both transaction sequence 610-1 and 610-2 believe that the value or state of "X" is "5." The database transaction in sequence 610-1 adds one to the value of "X" (i.e., X=X+1) and the database transaction in sequence 610-2 multiplies the value of X by 2 (i.e., Y=X*2) to set the value of "Y," and thus does not change the value of "X."

Each client system (or application or user) subsequently performs another transaction at database transaction F on the new value or state of "X." The database transaction in sequence 610-1 adds one to the value of "X" (i.e., X=X+1) and the database transaction in sequence 610-2 adds one to the value of X (i.e., X=X+1). This leads to an inconsistency that will eventually need to be resolved when reconciled because transaction sequence 610-1 has an assertion that says the value of "X" is "6" while transaction sequence 610-2 has an assertion that says the value of "X" is "5."

FIG. 6B illustrates the process of reconciling the assertions at database transaction E into the global transaction sequence 620. The database management system then identifies the inconsistency in the assertions at database transaction F and attempts to resolve the inconsistency. In this example, the system recognizes that at transaction F each of the transaction sequences 610-1 and 610-2 are simply attempting to add one to the value of "X." For example, each user of a client system corresponding to transaction sequence 610-1 and 610-2 may have simply hit the "like" button on a user's Facebook post, and thus the value "X" merely represents the number of people that like that post. In this case, it does not matter which database transaction comes first or what the current value of "X," the current number of likes for this particular post, actually is.

Accordingly, the system identifies a transform for the assertions at transaction F to add one to the value of "X" regardless of the current value (i.e., X+=1). In FIG. 6C, the system applies the transform, and thus reconciles the database transactions.

Figure 7:
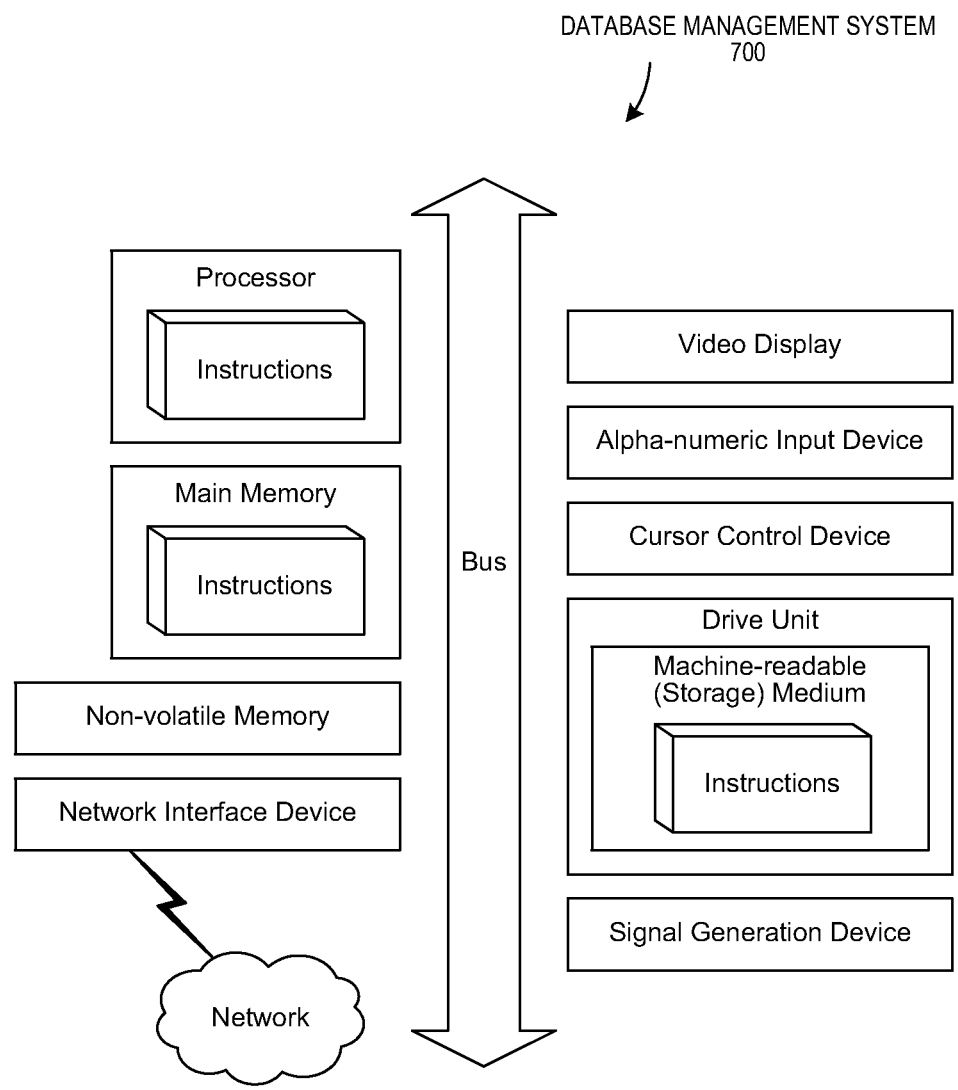
FIG. 7 shows a diagrammatic representation of a machine in the example form of a computer system within which a set of instructions, for causing the machine to perform any one or more of the methodologies discussed herein, may be executed, according to one embodiment.

FIG. 7 shows a diagrammatic representation of a machine in the example form of a computer system 700 within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a web appliance, a network router, switch or bridge, or any machine capable of executing a set of instructions (sequential or otherwise) that specify actions to be taken by that machine.

While the machine-readable medium is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine or computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for".) Accordingly, the applicant reserves the right to add additional claims after filing the application to pursue such additional claim forms for other aspects of the disclosure.

What is claimed is:

1. A method of consistency control in a distributed database system, the distributed database system comprising a database management system having a processing unit configured to implement the method, the method comprising:
   receiving, by an interface coupled to the processing unit of the database management system, a plurality of database transactions associated with a plurality of transaction sequences from a plurality of client systems in the distributed database system, wherein each transaction sequence indicates one or more uncommitted database transactions and each uncommitted database transaction includes one or more assertions that require consensus among a plurality of resources in the distributed database system to reconcile;
   detecting, by processing unit of the database management system, an inconsistency among assertions associated with two or more uncommitted database transactions from two or more transaction sequences of the plurality of transaction sequences, wherein the inconsistency indicates a lack of consensus among the plurality of resources with respect to the validity of one or more of the assertions; and
   processing, by the processing unit of the database management system, the two or more assertions associated with the two or more transaction sequences to generate a semantic preserving transform, wherein the semantic preserving transform, when applied to one or more of the two or more assertions, eliminates the inconsistency.

2. The method of claim 1, further comprising:
   reconciling, by the processing unit of the database management system, the database transactions by applying the semantic preserving transform to the one or more of the assertions.

3. The method of claim 1, wherein the semantic preserving transform indicates a modification that, when applied to the one or more assertions, eliminates the inconsistency.

4. The method of claim 1, wherein the two or more transaction sequences of the plurality of transaction sequences are reconciled into a global transaction sequence.

5. The method of claim 1, further comprising:
   processing, by the processing unit of the database management system, a set of rules to generate the semantic preserving transform.

6. The method of claim 5, wherein the set of rules comprise generalized instructions for processing the two or more assertions associated with the two or more transactions sequences to generate the semantic preserving transform.

7. The method of claim 1, further comprising:
   sending, by the interface coupled to the processing unit of the database management system, a message to one or more of the client systems associated with the two or more assertions associated with the two or more transaction sequences to solicit user input for resolving the inconsistency; and
   receiving, by the interface coupled to the processing unit of the database management system, a response indicating the user input.

8. The method of claim 7, further comprising:
processing, by the processing unit of the database management system, the user input and the two or more assertions associated with the two or more transaction sequences to generate the semantic preserving transform.

9. The method of claim 1, wherein the resources comprise other database management systems in the distributed database system.

10. The method of claim 1, wherein the resources comprise storage management systems in the distributed database system.

11. A method of consistency control in a distributed database system, the distributed database system comprising a database management system having a processing unit configured to implement the method, the method comprising:
detecting, by the processing unit of the database management system, an inconsistency among assertions associated with two or more database transactions from two or more transaction sequences of a plurality of transaction sequences, wherein the inconsistency indicates a lack of consensus among the plurality of resources with respect to the validity of one or more of the assertions;
processing, by the processing unit of the database management system, the two or more assertions associated with the two or more transaction sequences to generate a semantic preserving transform, wherein the semantic preserving transform, when applied to one or more of the two or more assertions, eliminates the inconsistency; and
reconciling, by the processing unit of the database management system, one or more uncommitted database transactions by applying the semantic preserving transform to the one or more assertions.

12. The method of claim 11, further comprising:
receiving, by an interface coupled to the processing unit of the database management system, the plurality of database transactions associated with the plurality of transaction sequences from a plurality of client systems in the distributed database system, wherein each transaction sequence indicates the one or more uncommitted database transactions and each uncommitted database transaction includes one or more assertions that require consensus among a plurality of resources in the distributed database system to reconcile.

13. The method of claim 11, wherein the semantic preserving transform indicates a modification that, when applied to the one or more assertions, eliminates the inconsistency.

14. The method of claim 11, wherein the two or more transaction sequences of the plurality of transaction sequences are reconciled into a global transaction sequence.

15. The method of claim 11, further comprising:
processing, by the processing unit of the database management system, a set of rules in addition to the two or more assertions to generate the semantic preserving transform.

16. The method of claim 15, wherein the set of rules comprise generalized instructions for processing the two or more assertions associated with the two or more transactions sequences to generate the semantic preserving transform.

17. The method of claim 11, further comprising:
sending, by an interface coupled to the processing unit of the database management system, a message to one or more of the client systems associated with the two or more assertions associated with the two or more transaction sequences to solicit user input for resolving the inconsistency; and
receiving, by the interface coupled to the processing unit of the database management system, a response indicating the user input.

18. The method of claim 17, further comprising:
processing, by the processing unit of the database management system, the user input and the two or more assertions associated with the two or more transaction sequences to generate the semantic preserving transform.

19. A database management system comprising:
a processing unit;
an interface configured to receive a plurality of database transactions associated with a plurality of transaction sequences from a plurality of client systems in the distributed database system, wherein each transaction sequence indicates one or more uncommitted database transactions and each uncommitted database transaction includes one or more assertions that require consensus among a plurality of resources in the distributed database system to reconcile;
a memory unit having instructions stored thereon, wherein the instructions, when executed by the processing unit, cause the processing unit to detect an inconsistency among assertions associated with two or more uncommitted database transactions from two or more transaction sequences of the plurality of transaction sequences, and process the two or more assertions associated with the two or more transaction sequences to generate a semantic preserving transform, wherein the semantic preserving transform, when applied to one or more of the two or more assertions, eliminates the inconsistency.

20. The database management system of claim 19, wherein the inconsistency indicates a lack of consensus among the plurality of resources with respect to the validity of one or more of the assertions.

21. The database management system of claim 19, wherein the instructions, when executed by the processing unit, further cause the processing unit to:
reconcile the uncommitted database transactions by applying the semantic preserving transform to the one or more of the assertions.

22. The database management system of claim 21, wherein the semantic preserving transform indicates a modification that, when applied to the one or more assertions, eliminates the inconsistency.

23. The database management system of claim 19, wherein the two or more transaction sequences of the plurality of transaction sequences are reconciled into a global transaction sequence.

24. The database management system of claim 19, wherein the instructions, when executed by the processing unit, further cause the processing unit to:
process a set of rules in addition to the two or more assertions to generate the semantic preserving transform.

25. The database management system of claim 24, wherein the set of rules comprise generalized instructions for processing the two or more assertions associated with the two or more transactions sequences to generate the semantic preserving transform.

26. The database management system of claim 25, wherein the interface is further configured to:
sending a message to one or more of the client systems associated with the two or more assertions associated with the two or more transaction sequences to solicit user input for resolving the inconsistency; and
receive a response indicating the user input.

27. The database management system of claim 26, wherein the instructions, when executed by the processing unit, further cause the processing unit to:
- process the user input and the two or more assertions associated with the two or more transaction sequences to generate the semantic preserving transform.

28. A database management system comprising:
- means for detecting an inconsistency among assertions associated with two or more database transactions from two or more transaction sequences of a plurality of transaction sequences, wherein the inconsistency indicates a lack of consensus among the plurality of resources with respect to the validity of one or more of the assertions;
- means for processing the two or more assertions associated with the two or more transaction sequences to generate a semantic preserving transform, wherein the semantic preserving transform, when applied to one or more of the two or more assertions, eliminates the inconsistency; and
- means for reconciling uncommitted database transactions by applying the semantic preserving transform to the one or more assertions.

\* \* \* \* \*